United States Patent [19]

Klein

[11] 4,432,146

[45] Feb. 21, 1984

[54] INTEGRATED DRILL LEVELING APPARATUS

[76] Inventor: Albert M. Klein, 96 Harmony Ave., East Keansburg, N.J. 07734

[21] Appl. No.: 498,550

[22] Filed: May 26, 1983

[51] Int. Cl.³ .............................................. G01C 9/28
[52] U.S. Cl. ...................................... 33/334; 33/382; 33/390
[58] Field of Search ................. 33/334, 370, 381, 390, 33/382

[56] References Cited

U.S. PATENT DOCUMENTS

| | | | |
|---|---|---|---|
| 960,718 | 6/1910 | Schtabe | 33/382 |
| 1,204,768 | 11/1916 | Hommel | 33/390 |
| 1,234,594 | 7/1917 | Wilner | 33/334 |
| 1,333,559 | 3/1920 | Moulton | 33/382 |
| 2,541,366 | 2/1951 | Kennedy | 33/382 |
| 3,540,122 | 11/1970 | Bogdan | 33/382 |
| 3,864,839 | 2/1975 | Wolf | 33/334 |
| 4,125,944 | 11/1978 | Esposito et al. | 33/334 |
| 4,295,279 | 10/1981 | Sienknecht | 33/334 |

FOREIGN PATENT DOCUMENTS 599061 10/1959 Italy ....................................... 33/334

OTHER PUBLICATIONS

"Drill Guide" Sears Catalog No. 9 GT 51726; p. 138.

*Primary Examiner*—Willis Little
*Attorney, Agent, or Firm*—Richard C. Woodbridge

[57] ABSTRACT

A drill includes an integrated bi-directional orienting means for leveling the device when in use. The bi-directional orienting means preferably comprises a circular bubble level attached to the butt of the drill. It is relatively easy for the drill operator to level the drill by keeping the bubble in the center of the circular level. A tubular level is separately attached to the top of the drill for guidance in the direction perpendicular to the plane of the circular level. In an alternative embodiment, a tubular level is integrally attached at right angles to the circular level. The liquid filled cavity inside the circular level and tubular level is continuous so that the indicator bubble can travel from the tubular level to the circular level and back again. The apparatus may be adhesively attached to the drill or, the drill may include a cavity for receiving and holding the apparatus.

2 Claims, 10 Drawing Figures

INTEGRATED DRILL LEVELING APPARATUS

BACKGROUND OF THE INVENTION

1. Field of the Invention

This invention relates to a means for leveling a drill or similar apparatus with respect to two or three orthogonal directions.

2. Description of the Prior Art

Several attempts have been made in the past to level drills and the like with bubble indicators. For example, the patent to Moulton, U.S. No. 1,333,559 discloses an "Attachment for Drills". The attachment comprises a pair of level sight gauges arranged at right angles to one another. The object of the device is to hold the drill at right angles with respect to the working surface.

The patents to Schtabe, U.S. No. 960,718 and Kennedy, No. 2,541,366 are directed towards the attachment of two or three levels for use with manual drills. Occasionally tubular levels are incorporated in the frame of the device that supports the drill. Such a device is available from Sears Roebuck and Company where the tubular level is incorporated into the portable work bench that holds the drill. The device is known as a Drill Guide, Catalog No. 9 GT 51726 and it includes adjustments so that a drill can be set at angles with 5° increments between 0° and 90°.

Tubular levels are also found in the context of electrical devices other than drills. For example, the patent to Bogdan, U.S. No. 3,540,122 describes a "Hedge Trimmer and Leveling System for Same". In that reference two tubular levels are built into the hedge trimmer and located in directions perpendicular to each other so as to allow the user to correctly orient the hedge trimming apparatus.

In general the prior art devices are moderately complicated and frequently bulky. The device described in U.S. Pat. No. 960,718, for example, is almost as large and cumbersome as the mechanical drill to which it is attached. Moreover, it has been found that the use of two or more tubular levels at one time is difficult to coordinate. While the eye follows the bubble in one level, it has been found, that the bubble in the other level tends to drift. These and other problems associated with the prior art have been overcome by the invention described in this disclosure.

SUMMARY OF THE INVENTION

Briefly described the invention comprises an integrated leveling system for use with an electric drill. According to the preferred embodiment of the invention an integrated bi-directional leveling device is attached to the rear end of an electric drill. The integrated bi-directional leveling device may comprise a circular bubble level adhesively attached to an appropriate flat place on the rear. The drill operator merely has to keep the bubble in the center of the bullseye in order to know that the drill is perpendicular with respect to a flat work surface. According to an alternative embodiment of the invention, a tubular level is integrated into the structure of the circular level so that the liquid filled cavities of the two levels are continuously connected. In that fashion the indicator bubble can travel from the tubular level portion to the circular level portion and back. The tubular level portion is perpendicular to the plane established by the circular level. The additional tubular level makes it possible to determine the orientation of the drill in a third orthogonal dimension with respect to the two orthogonal dimensions associated with the circular level.

An adhesive is preferably used to attach the circular level embodiment to the butt of the drill. However, it would also be possible to provide an appropriate cavity in the butt of the drill for receiving either the bi-directional circular level or the tri-directional embodiment. Suitable fasteners such as screws or clips might also be used to assist in the attachment.

It has been found that the integrated bi-directional and tri-directional leveling devices are less expensive and easier to use than prior art apparatus. It is relatively easy for a drill operator to monitor one bi-directional level than it is for him to monitor two separate uni-directional levels at one time. Therefore, the efficiency of the drill operator is significantly improved. These and other aspects of the present invention will be more fully understood by reference to the following drawings.

DETAILED DESCRIPTION OF THE INVENTION

During the course of this description the same numbers will be used to identify the same elements according to the different figures which illustrate the invention.

Figure 1A:
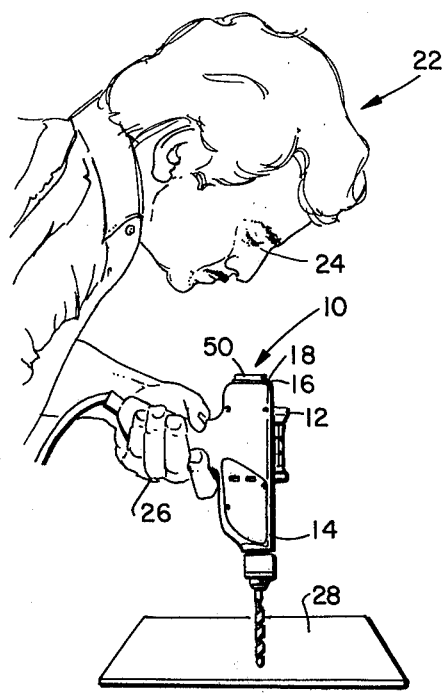
FIG. 1A is a side view of the preferred embodiment of the invention in which the device comprises an integrated bi-directional orienting apparatus and in which the drill operator is drilling a hole in the horizontal plane.

An integrated bi-directional leveling apparatus 10 according to the preferred embodiment of the invention is illustrated mounted on a drill 14 in FIG. 1A. The integrated bi-directional leveling device 10 preferably comprises a circular or "bullseye" level which is mounted on the flat portion of the drill butt 16. Also mounted on drill 14 is a tubular level 12. Tubular level 12 is mounted perpendicularly to the plane of circular level 10. A piece of double-backed sticky adhesive 18 is used to mount circular level 10 to drill butt 16. Similarly another piece of double-backed sticky adhesive 20 is used to mount tubular level 12 to the top of drill 14.

Drill 14 is a conventional type of hand drill that might be purchased in any ordinary hardware store. The specific drill 14 illustrated in FIGS. 1A through 2B is a Thor.

FIG. 1A shows the preferred embodiment 10 of the invention used to drill a hole into a horizontal workpiece 28. The drill operator 22 grabs the handle of the drill with this hand 26 in the conventional manner. Operator 22 then positions his eye 24 directly above circular level 10 so that he can follow the movement of bubble 40. By keeping bubble 40 centered within target ring lines 36 it is possible to keep the drill 14 absolutely perpendicular with respect to the plane of the earth. Therefore, if workpiece 28 is level with respect to the plane of the earth, then the drill 14 will produce a hole that is absolutely perpendicular to workpiece 28.

Figure 1B:
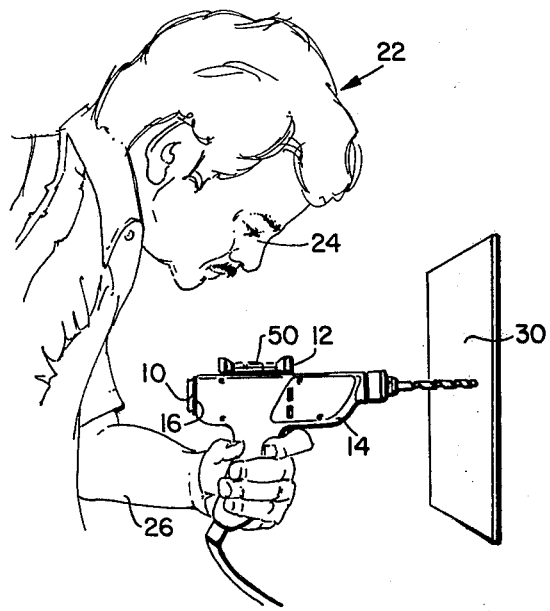
FIG. 1B is a side view of the preferred embodiment of FIG. 1A in which the drill operator is drilling a hole in the vertical plane.

In FIG. 1B the drill operator 22 is about to drill a hole in a vertical workpiece 30. The tubular level 12 orients the drill 14 horizontally with respect to the plane of the earth.

Figure 1C:
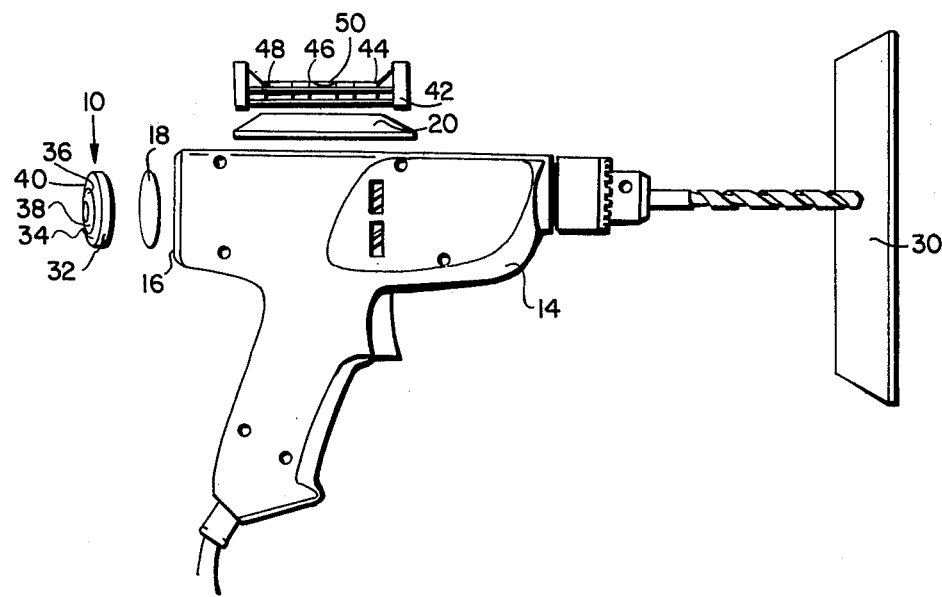
FIG. 1C is an exploded view of the preferred embodiment illustrated in FIGS. 1A and 1B.

FIG. 1C is an exploded view of the invention. The integrated circular level 10 includes a circular base 32 which supports a clear plastic housing 34. Clear plastic housing 34 is filled with a liquid 38 which has just enough room for a small target bubble 40. A small circular bullseye target 36 and orientation lines radiating therefrom are used to center the bubble 40 with respect to the level 10. An integrated circular level of this type can be purchased from conventional sources.

Tubular level 12 includes a housing 42 which supports a clear plastic case 44. Case 44 contains a clear liquid 48 with just enough room for a small target bubble 50. Target lines 46 are inscribed on case 44 and used to orient the level with respect to the bubble 50.

An integrated tri-directional leveling device 52 is illustrated in FIGS. 2A through 4D. The integrated tri-directional level 52 includes a circular portion 54 and a tubular portion 56. A continuous liquid filled cavity 58 connects the interior of the circular portion 54 to the tubular portion 56. A target bubble 60 is able to freely float from the cavity of the circular portion 54 to the cavity of the tubular portion 56 and back again. The liquid in cavity 58 could be mineral oil or other suitable material. The cavity on the inside of the tubular portion 56 bows outwardly in the middle so that bubble 60 tends to seek a central position when the tubular portion 56 is horizontal with respect to the earth.

Tubular level portion 56 is perpendicular to the plane of the circular level portion 54. A base 62 supports the circular level portion 54. Target markings 64 are printed or etched into the face of the circular level portion 54 and are employed to orient the circular portion 54 with respect to the traveling bubble 60. Likewise, target markings 66 are employed on the tubular portion 56 as a guide for bubble 60.

Figure 2A:
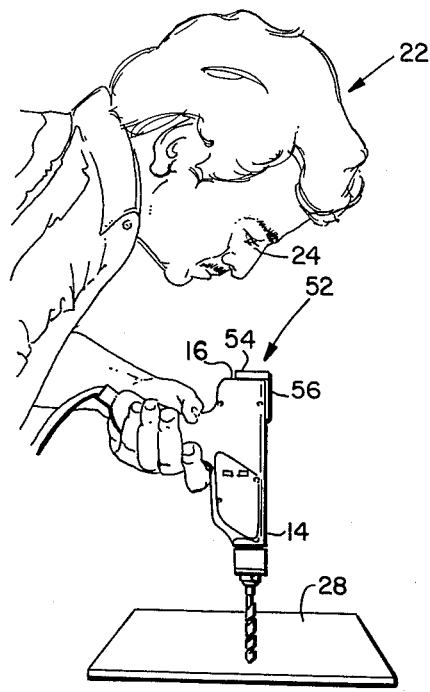
FIG. 2A is a side view of an alternative embodiment of the present invention in which the device comprises an integrated tri-directional orienting apparatus and in which the drill operator is drilling a hole in the horizontal plane.

The integrated tri-directional embodiment 52 is preferably mounted in a recess in the butt 16 of a drill 14 as illustrated in FIG. 2A. The recess in drill 14 has a geometry complimentary to the geometry of level 52 so that level 52 fits snuggly in the butt 16 of drill 14.

FIG. 2A illustrates the manner in which the integrated tri-directional level 52 is employed to drill a hole perpendicular to a horizontal workpiece 28. The operator 22 orients bubble 60 in the center of target ring lines 64 of the circular portion 54. When bubble 60 is in the center of target 64 the operator begins the drilling process. By keeping bubble 60 in the center of target 64 it is possible to guarantee that the hole drilled in workpiece 28 is perpendicular to its surface. This presupposes that workpiece 28 is horizontal with respect to the plane of the earth.

Figure 2B:
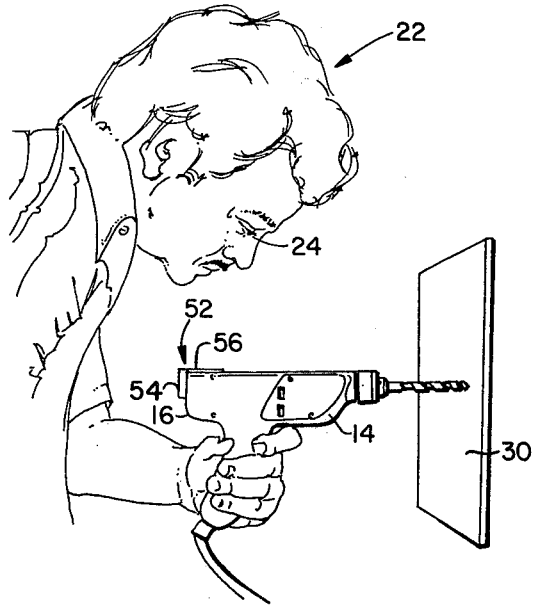
FIG. 2B is a side view of the improved integrated tri-directional leveling means illustrated in FIG. 2A in which the drill operator is drilling a hole in the vertical plane.
Figure 3:
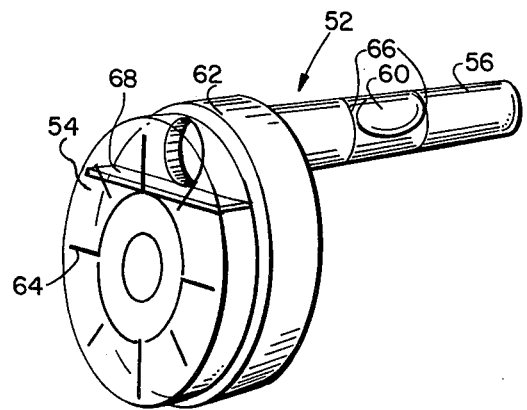
FIG. 3 is a perspective of the integrated tri-directional leveling means of FIGS. 2A and 2B.
Figure 4A:
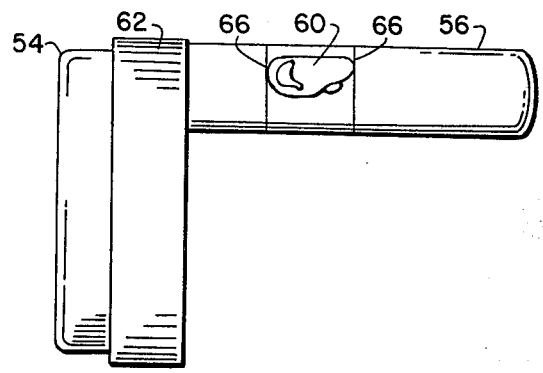
FIG. 4A is a side elevational view of the integrated tri-directional leveling means.
Figure 4B:
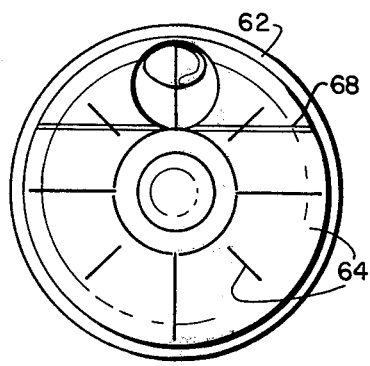
FIG. 4B is a front view of the improved integrated tri-directional leveling means of FIG. 4A.
Figure 4C:
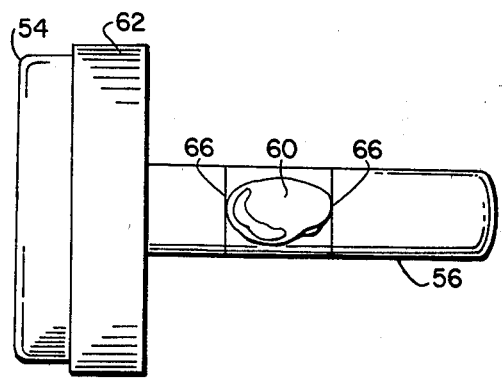
FIG. 4C is a top view of the integrated tri-directional leveling means of FIGS. 4A and 4B.
Figure 4D:
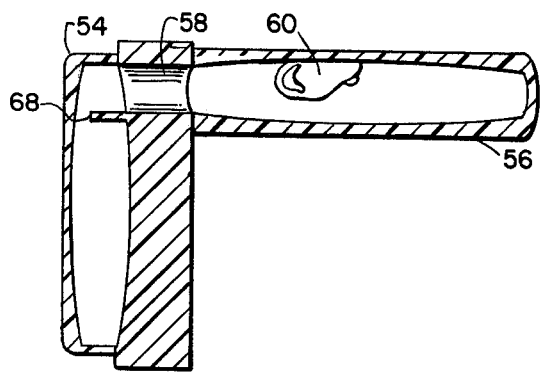
FIG. 4D is a cross-sectional view of the integrated tri-directional leveling means shown in FIGS. 4A-4C.

FIG. 2B illustrates the manner in which the integrated tri-directional level 52 is employed to drill a horizontal hole in a vertical workpiece 30. According to that embodiment the drill operator 22 keeps the bubble 60 within target lines 66 of the tubular level portion 56. As long as bubble 60 is within the target lines 66 the operator 22 knows that the hole will be parallel with respect to the plane of the earth.

There are several significant advantages to the present invention. Those advantages include the following:

First, The use of a circular level is superior as an indicator of two dimensional coordinates as opposed to two tubular levels mounted at right angles to each other. This is in part due to the fact that it is easier for the eye 24 of the drill operator 22 to follow the movement of one bubble than it is to follow the movement of two bubbles simultaneously.

Second, the use of tubular levels and the like on old fashioned hand or electric drills was not believed to be very effective. The jerky motion of the older equipment makes it difficult to keep the bubble within the target guide. However, the smoother operation of modern drills equipped with variable speed drives makes it possible to keep the bubble within target lines, especially at the lower speeds. Even at the higher speeds, modern electric hand drills appear to be smoother and more conducive to the use of liquid levels.

Third, integrated circular levels are relatively inexpensive and simple to use. They take up less room than two or more tubular levels mounted at right angles with respect to each other.

Fourth, the tri-directional integrated level 52 is especially compact. It preferably fits snuggly in a recess of the butt of drill 14. Integrating the circular and tubular portions 54 and 52 together guarantees that they will not get out of alignment.

Fifth, in addition to drilling holes that are horizontal or vertical with respect to the plane of the earth, it is also possible to orient the drill at other angles. In that regard the integrated level is good for eeping the drill on a predetermined track once the desired orientation is set. Also, it has been found that the integrated circular level device gives a finer reading of offset than do two mutually perpendicular tubular levels. For example, a drill operator 22 knows in which direction to move the target bubble in order to realign the circular level embodiment. However, if a drill operator 22 is working with two perpendicular tubular levels he has to adjust the bubble in one level before he can adjust the bubble in the other level in order to make a mid-course correction.

Sixth, it is also possible to read the circular level from other orientations. For example, it may be possible to read the level from below when drilling holes in a ceiling or the like. Some circular levels have cavities that center the bubble when the level is inverted 180°. Also, it is possible to use the bi-directional circular level as a tri-dimensional level by sighting the bubble on the edge of the level rather than in the middle.

While the invention has been described with reference to the preferred embodiment thereof, it will be appreciated by those of ordinary skill in the art that various changes can be made to the structure and parts of the invention without departing from the spirit and scope thereof.

I claim:

1. An integrated drill leveling apparatus comprising:

a bi-directional orienting means attachable to said drill for simultaneously assisting in the leveling of said drill in two orthogonal directions, said bi-directional leveling means comprising a circular bubble-type level, said circular level including a convex interior cavity which is tapered so as to be wider in the center of said circular level and thinner near the edges thereof;

further leveling means attached to the periphery of said circular level for determining the orientation of said drill in a direction perpendicular to the two orthogonal directions determined by said circular level, said further leveling means comprising a tubular type level, said tubular type level including a cavity that is tapered so as to be wider near the center thereof and thinner near the ends thereof with one of said ends being closed and the other end being open, the open end of said tubular cavity and the cavity of said circular level communicating with each other so as to form a continuous cavity;

liquid means housed within said continuous cavity;

bubble means carried by said liquid means and also housed within said continuous cavity, and barrier means in said cavity of said circular level located adjacent the point of communication of said cavities for preventing said bubble means from escaping into said tubular level when said circular level is inverted so that said tubular level points upwards away from the earth, wherein said integrated level measures orientations in three mutually orthogonal directions.

2. The apparatus of claim 1 further comprising:

barrier means in said cavity of said circular level for preventing said bubble means from escaping into said tubular level when said circular level is inverted so that said tubular level points upward away from the earth.

* * * * *